United States Patent
Jinka et al.

(10) Patent No.: US 12,219,737 B2
(45) Date of Patent: Feb. 4, 2025

(54) CRYOGENIC PACKAGING FOR THERMALIZATION OF LOW TEMPERATURE DEVICES

(71) Applicant: International Business Machines Corporation, Armonk, NY (US)

(72) Inventors: Oblesh Jinka, Stamford, CT (US); Salvatore Bernardo Olivadese, Stamford, CT (US); Sean Hart, Tarrytown, NY (US); Nicholas Torleiv Bronn, Long Island City, NY (US); Jerry M. Chow, White Plains, NY (US); Markus Brink, White Plains, NY (US); Patryk Gumann, Tarrytown, NY (US); Daniela Florentina Bogorin, Syracuse, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1274 days.

(21) Appl. No.: 16/445,470

(22) Filed: Jun. 19, 2019

(65) Prior Publication Data

US 2020/0404806 A1    Dec. 24, 2020

(51) Int. Cl.
*H05K 7/20* (2006.01)
*G06F 30/20* (2020.01)
(Continued)

(52) U.S. Cl.
CPC ......... *H05K 7/20372* (2013.01); *G06F 30/20* (2020.01); *G06N 10/00* (2019.01);
(Continued)

(58) Field of Classification Search
CPC .... H05K 7/20; H05K 7/20372; H01L 21/265; H01L 21/26593; H01L 23/3114;
(Continued)

(56) References Cited

U.S. PATENT DOCUMENTS 5,768,109 A * 6/1998 Gulick ................. H01L 23/13
257/E23.173
8,957,316 B2   2/2015 Fields et al.
(Continued)

FOREIGN PATENT DOCUMENTS

CN    108155153 A    6/2018
EP    2713391 A2    4/2014
(Continued)

OTHER PUBLICATIONS

Application No. 20734875.6, Reply to Examination Report, Nov. 29, 2022.
(Continued)

*Primary Examiner* — Harry E Arant
(74) *Attorney, Agent, or Firm* — Garg Law Firm, PLLC; Rakesh Garg; Erik Johnson

(57) ABSTRACT

A thermalization structure is formed using a cover configured with a set of pillars, the cover being a part of a cryogenic enclosure of a low temperature device (LTD). A chip including the LTD is configured with a set of cavities, a cavity in the set of cavities having a cavity profile. A pillar from the set of pillars and corresponding to the cavity has a pillar profile such that the pillar profile causes the pillar to couple with the cavity of the cavity profile within a gap tolerance to thermally couple the chip to the cover for heat dissipation in a cryogenic operation of the chip.

16 Claims, 17 Drawing Sheets

(51) Int. Cl.
*G06N 10/00* (2022.01)
*H01L 21/265* (2006.01)
*H01L 23/31* (2006.01)
*H01L 23/32* (2006.01)
*H01L 31/02* (2006.01)
F28D 21/00 (2006.01)
G06F 113/20 (2020.01)

(52) U.S. Cl.
CPC .... *H01L 21/26593* (2013.01); *H01L 23/3107* (2013.01); *H01L 23/3114* (2013.01); *H01L 23/32* (2013.01); *H01L 31/0201* (2013.01); *F28D 2021/0028* (2013.01); *G06F 2113/20* (2020.01)

(58) Field of Classification Search
CPC ............. H01L 23/3107; H01L 23/3677; H01L 23/455; H01L 31/0201; H01L 23/32; F28D 19/006; F28D 2021/0028
See application file for complete search history.

(56) References Cited

U.S. PATENT DOCUMENTS

| | | | |
|---|---|---|---|
| 9,583,453 | B2 | 2/2017 | Shearer et al. |
| 9,991,211 | B2 | 6/2018 | Prakash et al. |
| 9,865,648 | B2 | 9/2018 | Bunyk |
| 10,269,678 | B1 | 4/2019 | Viswanathan et al. |
| 2014/0131898 | A1 | 5/2014 | Shearer et al. |
| 2014/0246763 | A1 | 9/2014 | Bunyk |
| 2014/0361440 | A1 | 12/2014 | Bar et al. |
| 2015/0187675 | A1 | 7/2015 | Tang et al. |
| 2015/0338176 | A1 | 11/2015 | Chen et al. |
| 2016/0181174 | A1* | 6/2016 | Gambino .............. H01L 23/481 438/666 |
| 2017/0287851 | A1 | 10/2017 | Prakash et al. |
| 2017/0323844 | A1 | 11/2017 | Karlicek, Jr. |
| 2018/0102469 | A1 | 4/2018 | Das et al. |
| 2019/0044047 | A1 | 2/2019 | Elsherbini et al. |
| 2019/0206759 | A1* | 7/2019 | Viswanathan .......... H01L 23/36 |

FOREIGN PATENT DOCUMENTS

| | | | |
|---|---|---|---|
| JP | 04312933 | A | 11/1992 |
| JP | 2001284503 | A | 10/2001 |
| JP | 2009253236 | A | 10/2009 |
| JP | 2011258764 | A | 12/2011 |
| JP | 2012060132 | A | 3/2012 |
| JP | 2014143305 | A | 8/2014 |
| JP | 2016048728 | A | 4/2016 |
| JP | 2016131218 | A | 7/2016 |
| JP | 2019041014 | A | 3/2019 |
| KR | 200452313 | Y1 | 2/2011 |
| WO | 2013108718 | A1 | 7/2013 |
| WO | 2016104777 | A1 | 6/2016 |
| WO | 2017015432 | A1 | 1/2017 |
| WO | 2018125604 | A1 | 7/2018 |
| WO | WO-2018231212 | A1 * | 12/2018 |

OTHER PUBLICATIONS

Application No. 2020296292, Notice of acceptance for patent application, Sep. 28, 2022.
Application No. 20734875.6, EP Examination Report, Aug. 12, 2022.
Das et al., Cryogenic Qubit Integration for Quantum Computing, 2018 IEEE 68th Electronic Components and Technology Conference (ECTC), IEEE, May 29, 2018 (May 29, 2018), pp. 504-514.
International Searching Authority, PCT/EP2020/067132, Oct. 2, 2020.
OA1, Application No. 202080036793.6, May 31, 2022.
Bronn et al., "High Coherence Plane Breaking Packaging for Superconducting Qubits", 2018 ARXIV. https://arxiv.org/pdf/1709.02402.pdf, arXiv:1709.02402v2 [quant-ph] Feb. 14, 2018.
Gambino et al; Thin silicon wafer processing and strength characterization, https://ieeexplore.ieee.org/document/6599153, Jul. 15-19, 2013, Proceedings of the 20th IEEE International Symposium on the Physical and Failure Analysis of Integrated Circuits (IPFA), Suzhou, China.
Pollack, Kapitza Resistance, Reviews of Modern Physics, Rev. Mod. Phys. 41, 48—Published Jan. 1, 1969. https://journals.aps.org/rmp/abstract/10.1103/RevModPhys.41.48.
Soltani et al., Laser sintering of copper nanoparticles on top of silicon substrates, Nanotechnology, 035203.
Application No. 10-2021-7039134, OA1, Apr. 20, 2023.
Application No. 10-2021-7039134, OA1 English Translation, Apr. 20, 2023.
Intellectual Property Office of Singapore, Application No. 11202110275Q, Written Opinion, Sep. 13, 2023.
Application No. 2021-574218, Notice of Reasons for Refusal, Oct. 23, 2023.
Application No. 2021-574218, Notice of Reasons for Refusal, English Translation, Oct. 23, 2023.
Application No. 11202110275Q, Notice for Eligibility of Grant, Jan. 3, 2024.
Amended Claims, EP Application No. 20734875.6, Oct. 9, 2024, 3 pages.
Amended Description, EP Application No. 20734875.6, Oct. 9, 2024, 15 pages.
EP Amendment Letter, EP Application No. 20734875.6, Oct. 9, 2024, 2 pages.

* cited by examiner (PRIOR-ART)

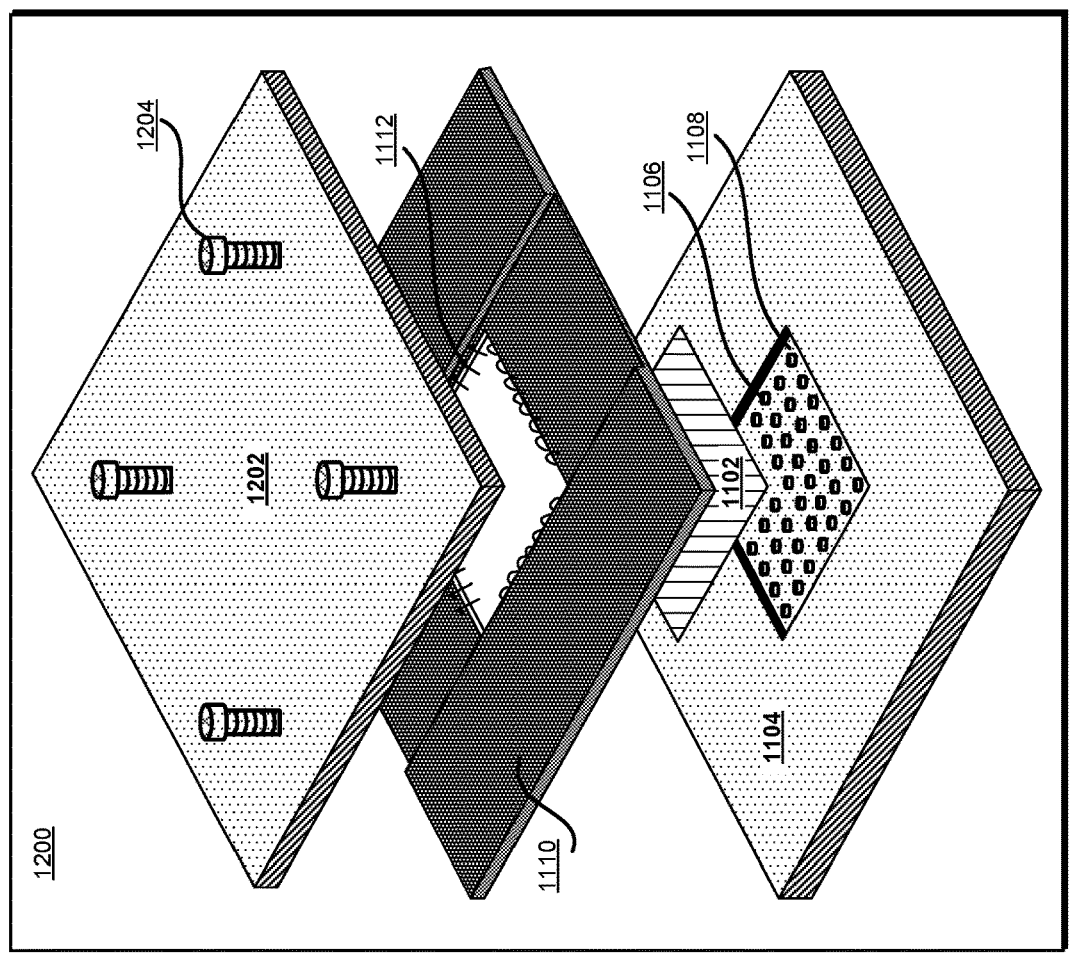
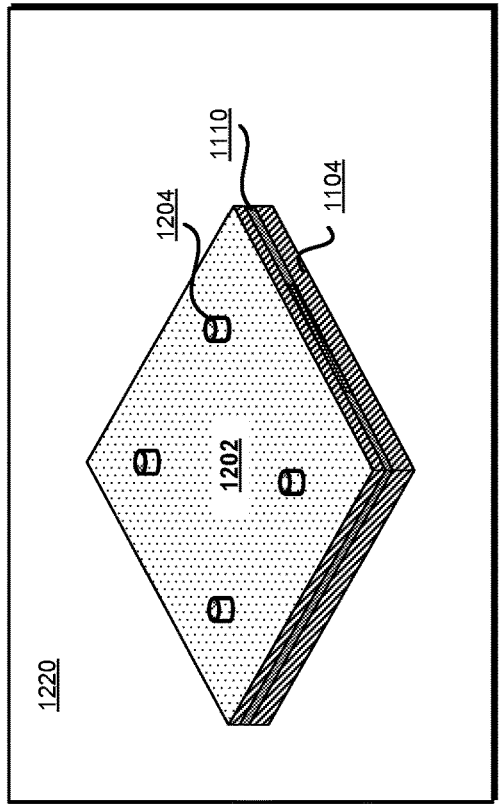
FIGURE 12

CRYOGENIC PACKAGING FOR THERMALIZATION OF LOW TEMPERATURE DEVICES

TECHNICAL FIELD

The present invention relates generally to a cooling apparatus for semiconducting or superconducting chips. More particularly, the present invention relates to cryogenic packaging for thermalization of low temperature devices.

BACKGROUND

A "low temperature" range, as used herein, refers to a cryogenic temperature range, which starts at or about 77 degrees Kelvin (K) or lower, and down to at least 1 millikelvin (0.001 K), and in some cases as low as practicable, e.g., to 0.000001 K using presently available technology. A "low temperature" is a temperature in the cryogenic temperature range. Semiconducting device, and/or superconducting devices, produce heat when operating. Devices operating in a cryogenic temperature range also produce heat while operating, but the heat removal poses unique challenges in low temperature operations.

A device operating a cryogenic temperature range is hereinafter referred to as a "low temperature device, or "LTD" (plural, LTDs). Most LTDs operating at cryogenic temperatures rely on materials that exhibit superconducting properties at those temperatures. To be able to remove heat from a structure operating in a cryogenic temperature range, a material has to be a good thermal conductor in the cryogenic temperature range. For a material to be regarded as a good thermal conductor in a specified temperature range, the material must exhibit at least a threshold level of thermal conductivity while operating as a thermal conductor in that temperature range. For example, a thermal conductivity of greater than a 1 Watt/(centimeter*K) at 4 Kelvin, is an acceptable threshold level of good thermal conductivity in a given range of temperatures, including in a cryogenic temperature range, according to the illustrative embodiments.

Thermalization of a structure is the process and apparatus to conduct heat to or from the structure. Thermalization of a structure often requires a good thermal conductor physically attached to the structure for heat conduction to/from the structure, as the need may be. The illustrative embodiments recognize that for good thermalization, an amount of material that intervenes between a heat producing element and a heat dissipating element, where the material is a poor thermal conductor in cryogenic temperature range, presents difficulty in thermalizing the LTD.

Silicon and sapphire are some common examples of substrate materials used to fabricate LTDs. The illustrative embodiments recognize that generally, silicon, sapphire, or other commonly used substrate materials tend to become poor thermal conductors in cryogenic temperature range. Thus, the illustrative embodiments recognize that if an LTD is fabricated on one surface of the substrate (e.g., a top surface) and the thermalization is attempted from an opposite surface of the substrate (e.g., the bottom surface), the thermalization is not effective to a desirable level because of the intervening silicon or other substrate material between the heat producing device on top and the thermalization structure attached to the bottom of the substrate.

Many LTDs are dimensioned in only a few micrometers to few millimeters along each side, and comprise fragile chips fabricated on/in a substrate material that is only approximately 150-300 nanometers (nm) and could be up to micrometers (um) thick. To reduce the amount of substrate material intervening the heat producing device and the thermalization structure, presently available techniques mill down the bottom side of the substrate, to about substantially less than the original thickness, e.g., to 400-500 um. The illustrative embodiments recognize that thinning the wafer or substrate in this manner dramatically increases the chances of the chip cracking, the LTD failing, and good thermalization still not occurring due to the reduced rigidity of the chip—and therefore the reduced ability to maintain adequate thermal contact or coupling between the chip and the thermalization structure.

Some low LTDs comprise more than one chip coupled to each other via fragile cold welds, e.g., using soft solder material. For example, a quantum processor can be fabricated in a flip-chip configuration in which one chip—an interposer chip comprising readout circuitry with connection points—is flipped over onto a second chip—a qubit chip comprising qubits and contact pads—such that the connection points and the contact pads are aligned and facing each other. The connection points on the interposer are cold welded to the contact pads on the qubit chip using a soft solder material. The cold welding holds the interposer at a predetermined distance from the qubit chip to produce certain electrical characteristics in the resulting quantum processor. The distance between the chips in a flip-chip configuration is an important factor in the correct operation of the flip-chip configuration.

The illustrative embodiments recognize that a thinned qubit chip, having reduced rigidity, can not only cause poor thermalization or defect for the above reasons but also make it difficult to maintain the separation distance with the interposer, leading to LTD failure for this additional reason. If an interposer chip is milled and thermalized, the same problems are likely to occur on the interposer chip side of the flip-chip assembly.

Furthermore, the illustrative embodiments recognize that poor thermalization also causes improper, incorrect, or problematic operation of the LTD in other ways. For example, an LTD that comprises qubits is often coupled to circuit elements on a printed circuit board (PCB) or another chip using wire bonds. A poorly thermalized chip causes elevated temperature at the quantum device, resulting in reduced coherence, increased error rate, and increased crosstalk between wire bonds.

LTDs devices such as qubits, quantum processors, and certain low temperature flip-chip assemblies are fabricated using superconducting and semiconductor materials in known semiconductor fabrication techniques. An LTD generally uses one or more layers of different materials to implement the device properties and function. A layer of material can be superconductive, conductive, semi-conductive, insulating, resistive, inductive, capacitive, or have any number of other properties. Different layers of materials may have to be formed using different methods, given the nature of the material, the shape, size or placement of the material, other materials adjacent to the material, and many other considerations.

A Fabrication process for a semiconducting or superconducting LTDs includes dosing and other methods of depositing and/or removing materials having various electrical and/or mechanical characteristics. Superconducting devices are often planar, i.e., where the superconductor structures are fabricated on one plane. A non-planar device is a three-dimensional (3D) device where some of the structures are formed above or below a given plane of fabrication.

Some LTDs are fabricated using a flip-chip geometry. In the flip-chip geometry, a first chip (such as a non-limiting example of a qubit chip in a flip-chip quantum processor) is fabricated having a number of individual devices upon a substrate, and a second chip (such as a non-limiting example of an interposer chip) having one or more connections is fabricated on a separate substrate. Solder bumps are deposited onto chip pads on a first surface of the first chip and/or second chip, and the first chip or second chip is flipped over so that its first side faces down. The first chip and second chip are aligned and bump-bonded at a separation distance from one another, so that the solder of the solder bumps complete the electrical connection of the first chip and the second chip.

Bumps of a suitable material, such as soldering material with the desired electrical, thermal, ductility, malleability, and cold welding properties in cryogenic and other operating conditions, are deposited onto chip pads on a first surface of the first chip and/or the second chip. Generally, any reference to a solder bump should be construed to include bumps made of material that satisfy these requirements.

SUMMARY

The illustrative embodiments provide a cryogenic packaging for thermalization of low temperature devices, and a method and system of fabrication therefor. An embodiment provides a thermalization structure that includes a cover configured with a set of pillars, the cover being a part of a cryogenic enclosure of a low temperature device (LTD). The embodiment further includes a chip comprising the LTD, the chip configured with a set of cavities, a cavity in the set of cavities having a cavity profile, wherein a pillar from the set of pillars and corresponding to the cavity has a pillar profile such that the pillar profile causes the pillar to couple with the cavity of the cavity profile within a gap tolerance to thermally couple the chip to the cover for heat dissipation in a cryogenic operation of the chip.

An embodiment provides a computer-implemented method of fabricating a thermalization structure.

An embodiment provides a fabrication system for fabricating a thermalization structure.

An embodiment provides a quantum processor that can be formed using a thermalization structure disclosed herein.

An embodiment provides a quantum data processing system that can be formed using a thermalization structure disclosed herein.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 12 depicts a block diagram of an example LTD thermalized in accordance with an illustrative embodiment;

DETAILED DESCRIPTION

Figure 1:
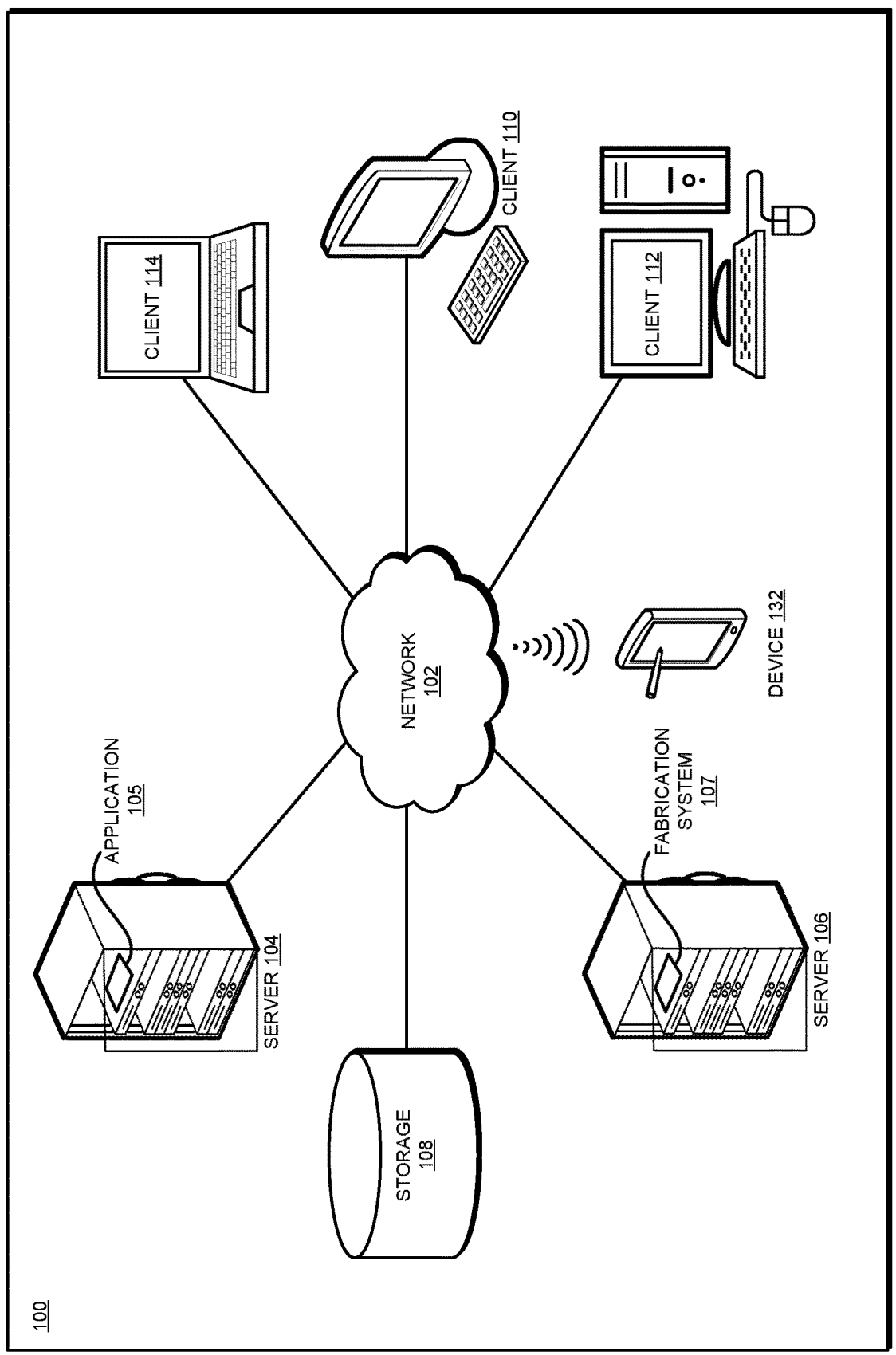
FIG. 1 depicts a block diagram of a network of data processing systems in which illustrative embodiments may be implemented.

The illustrative embodiments used to describe the invention generally address and solve the above-described problems or needs and other related problems or needs by providing a cryogenic packaging for thermalization of low temperature devices. The illustrative embodiments also provide a method and system for fabricating the cryogenic packaging for thermalization of low temperature devices, and a quantum processor and data processing system formed using the described cryogenic packaging for thermalization of low temperature devices.

As contemplated herein, a packaging of a chip that contains an LTD comprises at least one cover—a bottom cover, and preferably two covers—a top cover and a bottom cover. Among several functions attributed to a cover in a packaging of an LTD, one function of the cover is to operate as a thermalization structure for the chip containing the LTD. The cover is fabricated from a material that is known to be a good thermal conductor in cryogenic temperature range. Copper is one non-limiting example material that can be used to fabricate a cover. A copper cover is often interchangeably referred to as a "copper penny" cover. Two copper penny covers form a copper pennies enclosure.

The illustrative embodiments do not require milling the wafer so that the chip thickness is not reduced. The illustrative embodiments use the chip in its original fabricated thickness and provide structures and method of thermalizing the chip at that original thickness.

Only as a non-limiting example, various embodiments are described using a copper penny bottom cover attached to a bottom side of an LTD chip. Without departing the scope of the illustrative embodiments, an implementation can fabricate a top cover in a similar manner, apply to a top of a chip, e.g., to the top surface of a flip-chip assembly. Similarly, without departing the scope of the illustrative embodiments, an implementation can fabricate a top cover and a bottom cover in a similar manner, and apply to a top and a bottom surface, respectively, of a chip.

An embodiment modifies a designated surface of a cover to which a chip is to be thermalized. In some cases, the designated surface can be, but need not be, a surface inside a chip-shaped cavity in (or protrusion on) the cover such that the chip can be set on the surface inside the cavity (or on top of the protrusion).

Specifically, an embodiment causes a fabrication system to fabricate a plurality of pillar or pillar-like structures on the designated surface of the cover. A pillar is a protrusion on the designated surface of the cover. The protrusion has a cross-section and a height.

A non-limiting fabrication method that is usable to fabricate a set of pillars includes sintering the designated surface with a material selected for the pillars in which the pillar material is molded into the pillar shapes by a casting of an opposite shape. Other methods of fabricating the pillars, such as masking and etching, cutting or stamping, chemical or mechanical methods of material removal or deposition, and several others, are contemplated within the scope of the illustrative embodiments.

In one embodiment, all pillars in a set of pillars are of the same cross-section shape and area, and of the same height. In another embodiment, all pillars in a subset of a set of pillars are of the same cross-section shape and area, and of the same height, but different subsets of pillars are configured to have different cross-section shapes, different cross-sectional areas, different heights, or some combination of one or more of these and other possible variations. For example, a pillar having a tapered profile—with a larger cross-section at one height within the pillar (e.g., at the bottom of the pillar) than at a different height within the pillar (e.g., at the top of the pillar) is contemplated within the scope of the illustrative embodiments. As another example, a pillar having a different cross-sectional shape at one height within the pillar and a different cross-sectional shape at a different height within the pillar is also a contemplated adaptation of an embodiment described herein. In one embodiment, a shape, size, location of a pillar, or some combination thereof, is determined by a shape, size, location of an LTD or LTD component on the chip, or some combination thereof.

An embodiment further causes the fabrication system to deposit, on a surface of a pillar, a layer (lining or liner) of a material that is known to be a good thermal conductor at cryogenic temperature range. A pillar including a lining is referred to herein as a lined pillar. The deposited lining increases at least one of the outside dimensions of the pillar. For example, in one embodiment, the deposited lining may be deposited on only a side wall of the pillar, thereby increasing a cross-sectional area of the pillar but not the height. As another example, in another embodiment, the deposited lining may be deposited on only a top surface of the pillar, thereby increasing a height of the pillar but not the cross-sectional area of the pillar. As another example, in another embodiment, the deposited lining may be deposited on a top surface as well as a side wall of the pillar, thereby increasing a height of the pillar and the cross-sectional area of the pillar. In one embodiment, the lining is optional, such as when a material of the cover—onto which the pillar is formed—itself is an acceptably good thermal conductor at cryogenic temperature range, leaving the pillar as an unlined pillar. In one embodiment, the depositing of the lining can be accomplished by sputtering the lining material onto the pillar.

An embodiment modifies a thermal surface of a chip, which is to be thermalized with the designated surface of the cover. In some cases, the thermal surface can be, but need not be, a surface of a chip (e.g., the bottom surface of the chip) that is opposite the surface of the chip on which the LTD is fabricated (e.g., the top surface of the chip). The thermal surface can be, but need not be, substantially flat to practice an embodiment. For example, a thermal surface of the chip can be fabricated or processed to have a step, notch, groove, cavity, protrusion, or another contour which is designed to match a corresponding contour on the designated surface of the cover. An embodiment can be adapted to modify a contoured thermal surface in a manner described herein with respect to a flat thermal surface, and such adaptations are contemplated within the scope of the illustrative embodiments.

Specifically, an embodiment causes a fabrication system to fabricate a plurality of sockets or cavity-like recessed structures (interchangeably referred to herein as either a socket, cavity, or a recess unless distinguished where used) on the thermal surface of the chip. A cavity is a hole-like space formed in the thermal surface of the chip. The cavity has a cross-section and a depth.

A non-limiting fabrication method that is usable to fabricate a set of cavities includes photolithographically etching or recessing the thermal surface in which the substrate material removed to form the cavity shapes. A variety of methods of fabricating the cavities are available in the semiconductor fabricating arts, such as machining, masking and etching, sputtering, chemical or mechanical or laser methods of material removal, and several others, and the same are contemplated within the scope of the illustrative embodiments. It should be noted that a method of forming a cavity according to an embodiment does not cause thinning of the chip's thickness, as contrasted with the prior-art methods of thermalizing a chip.

In one embodiment, all cavities in a set of cavities are of the same cross-section shape and area, and of the same depth. In another embodiment, all cavities in a subset of a set of cavities are of the same cross-section shape and area, and of the same depth, but different subsets of cavities are configured to have different cross-section shapes, different cross-sectional areas, different depths, or some combination of one or more of these and other possible variations. For example, a cavity having a tapered profile—with a larger cross-section at one depth within the cavity (e.g., at the mouth of the cavity) than at a different depth within the cavity (e.g., at the base of the cavity) is contemplated within the scope of the illustrative embodiments. As another example, a cavity having a different cross-sectional shape at one depth within the cavity and a different cross-sectional shape at a different depth within the cavity is also a contemplated adaptation of an embodiment described herein.

In one embodiment, a shape, size, location of a cavity, or some combination thereof, is determined by a shape, size, location of an LTD or LTD component on the chip, or some combination thereof. In one embodiment, a shape, size, or both of a cavity is determined by a location of the cavity on the chip. In one embodiment, a shape, size, location of a pillar, or some combination thereof, is determined by a shape, size, location of a cavity on the chip, or some combination thereof.

An embodiment further causes the fabrication system to deposit, on a surface inside a cavity, a layer (lining or liner) of a material that is known to be a good thermal conductor at cryogenic temperature range. A cavity including a lining is referred to herein as a lined cavity. The deposited lining reduces at least one of the inside dimensions of the cavity. For example, in one embodiment, the deposited lining may be deposited on only a side wall of the cavity, thereby reducing a cross-sectional area of the cavity but not the depth. As another example, in another embodiment, the deposited lining may be deposited on only a base surface of the cavity, thereby reducing a depth of the cavity but not the cross-sectional area of the cavity. As another example, in another embodiment, the deposited lining may be deposited on a base surface as well as a side wall of the cavity, thereby reducing a depth of the cavity and the cross-sectional area of the cavity. In one embodiment, the lining is optional, such as when a material of the chip—into which the cavity is formed—itself is an acceptably good thermal conductor at cryogenic temperature range, leaving the cavity as an unlined cavity. In one embodiment, the depositing of the lining can be accomplished by sputtering the lining material into the cavity.

A cavity in a thermal surface of a chip has zero, one, or more matching corresponding pillars in a designated surface in a cover. Conversely, a pillar in a designated surface of a cover has zero, one, or more matching corresponding cavities in a thermal surface of a chip. An embodiment fabricates a cavity on a chip such that the cavity can be matched with a pillar of a compatible profile on the cover. Correspondingly, an embodiment fabricates a pillar on a cover such that the pillar can be matched with a cavity of a compatible profile on the chip.

A cavity and a pillar have a matching profile when a cross-sectional shape of the pillar is similar to a cross-sectional shape of the cavity, and a height of the pillar is similar to a depth of the cavity, such that (i) in case of a lined cavity, the pillar can occupy the lined cavity within a defined gap tolerance between the surfaces of the pillar and the surfaces of the lined cavity, or (ii) in case of an unlined cavity, the pillar can occupy the unlined cavity within a defined gap tolerance between the surfaces of the pillar and the surfaces of the unlined cavity. A non-limiting example of a gap tolerance is +/−1 micrometer. Within the scope of the illustrative embodiments, the gap tolerance can be a single tolerance for the entirety of the cavity, or a set of tolerances including different tolerances for different sections of the cavity, or separate cross-sectional tolerance and depth tolerance, or some combination of these and other similarly purposed tolerances.

In one embodiment, all pillars in a set of pillars (and the corresponding cavities in a set of cavities) are configured for thermalization. In another embodiment, the pillars in one subset of pillars (and the corresponding subset of cavities in a set of cavities) is configured for thermalization while another subset of pillars (and the corresponding subset of cavities in a set of cavities) is configured for only chip alignment, or for alignment and thermalization. In another embodiment, the pillars in one subset of pillars (and the corresponding subset of cavities in a set of cavities) is configured for thermalization while another subset of pillars (and the corresponding subset of cavities in a set of cavities) is configured for an alternative function, or for the alternative function and thermalization.

Chip alignment is a process of aligning the thermal surface of the chip with the designated surface of the cover, such that a pillar is substantially centered with a corresponding cavity and the thermal surface of the chip completely, or substantially completely overlaps with the designated surface of the cover. All pillars in the cover may, but need not necessarily have a matching cavity when the chip is aligned. All cavities in the chip may, but need not necessarily be occupied by corresponding pillars on the cover when the chip is aligned. An alternative function attributed to a pillar (or cavity) includes, but is not limited to, ensuring an order in which the pillars from a set of pillars occupy corresponding cavities from a set of cavities, preventing undesirable orientation of the chip relative to the cover, and many others.

An embodiment causes a fabrication system to thermalize the chip to the cover by coupling, in a manner described herein, a set or a subset of pillars on the designated surface of the cover with a set or a subset of cavities on the thermal surface of the chip. In one embodiment, the fabrication system is further caused to enclose the combined chip-cover assembly in a suitable cryogenic coolant, e.g., liquid helium. Coupling a chip with a cover in a manner described herein increases the surface area available for heat dissipation from the chip, desirable alignment and tightness of fit between the chip and the cover within specified tolerances, easier fabrication (e.g., sintering copper cover is significantly easier than sintering on a thinned silicon chip), or some combination of these and other advantages.

A fabrication method for fabricating a flip-chip quantum computing device of an embodiment can be implemented as a software application. The application implementing a fabrication method can be configured to operate in conjunction with an existing superconducting fabrication system—such as a lithography system.

Only, for the clarity of the description, and without implying any limitation thereto, the illustrative embodiments are described using an example number of pillars and cavities. An embodiment can be implemented with any number, type, or combination of pillars and cavities. Only, for the clarity of the description, and without implying any limitation thereto, the illustrative embodiments are described using an example number and types of LTDs on a chip. An embodiment can be implemented with any number, type, or combination of chips, including but not limited to qubit chips, interposer chips, quantum processors in flip-chip arrangement, and other semiconducting or superconducting devices.

Furthermore, a simplified diagram of the non-limiting example chip and cover geometry is used in the figures and the illustrative embodiments. In an actual fabrication of a chip, additional structures that are not shown or described herein, or structures different from those shown and described herein, may be present without departing the scope of the illustrative embodiments. Similarly, within the scope of the illustrative embodiments, a shown or described structure in the example cover may be fabricated differently to yield a similar operation or result as described herein.

Differently shaded portions in the two-dimensional drawing of the example structures, layers, and formations are intended to represent different structures, layers, materials, and formations in the example fabrication, as described herein. The different structures, layers, materials, and formations may be fabricated using suitable materials that are known to those of ordinary skill in the art.

A specific shape, location, position, or dimension of a shape depicted herein is not intended to be limiting on the illustrative embodiments unless such a characteristic is expressly described as a feature of an embodiment. The shape, location, position, dimension, numerosity, or some combination thereof, are chosen only for the clarity of the drawings and the description and may have been exaggerated, minimized, or otherwise changed from actual shape, location, position, or dimension that might be used in actual lithography to achieve an objective according to the illustrative embodiments.

Furthermore, the illustrative embodiments are described with respect to a specific actual or hypothetical semiconducting or superconducting device, e.g., a qubit that is presently viable, only as an example. The steps described by the various illustrative embodiments can be adapted for thermalizing a variety of LTDs in a similar manner, and such adaptations are contemplated within the scope of the illustrative embodiments.

An embodiment when implemented in an application causes a fabrication process to perform certain steps as described herein. The steps of the fabrication process are depicted in the several figures. Not all steps may be necessary in a particular fabrication process. Some fabrication processes may implement the steps in different order, combine certain steps, remove or replace certain steps, or perform some combination of these and other manipulations of steps, without departing the scope of the illustrative embodiments.

The illustrative embodiments are described with respect to certain types of materials, electrical properties, thermal properties, mechanical properties, structures, formations, shapes, layers orientations, directions, steps, operations, planes, dimensions, numerosity, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

The illustrative embodiments are described using specific designs, architectures, layouts, schematics, and tools only as examples and are not limiting to the illustrative embodiments. The illustrative embodiments may be used in conjunction with other comparable or similarly purposed designs, architectures, layouts, schematics, and tools.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

With reference to the figures and in particular with reference to FIG. 1, this figure depicts an example diagram of a data processing environment in which a method of the illustrative embodiments may be implemented. FIG. 1 is only an example and is not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Device 132 is an example of a mobile computing device. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Fabrication system 107 is a software component of any suitable system for fabricating and thermalizing an LTD, such as a Josephson junction, a qubit, and other superconducting structures used in quantum computing devices. Generally, fabrication systems and their corresponding software components for manufacturing LTDs, including devices for quantum computing usage, are known. Application 105 provides instructions to such a known fabrication system via fabrication application 107 for causing the assembly of a novel cryogenic packaging for thermalization of low temperature devices contemplated in the illustrative embodiments, in a manner described herein.

Figure 2:
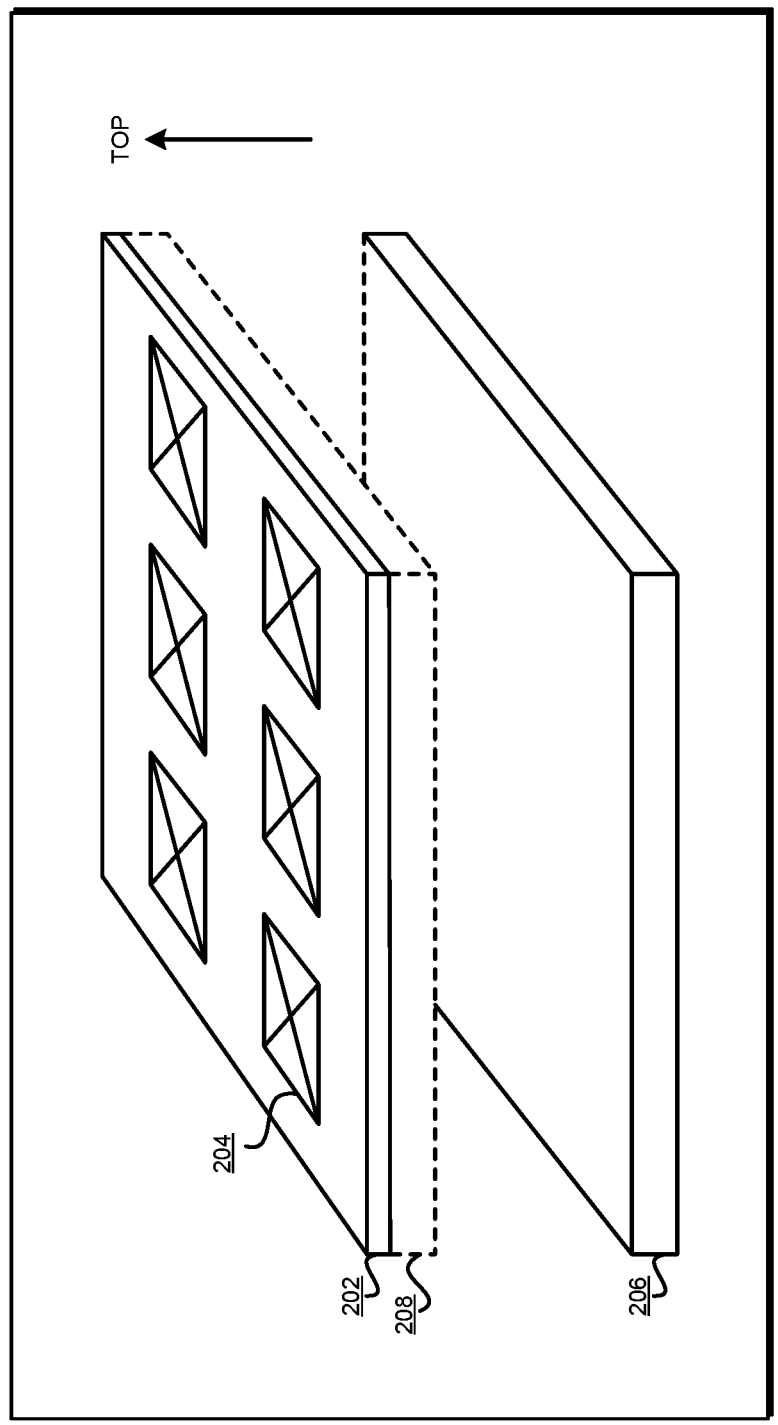
FIG. 2 depicts a block diagram of a problem with a prior-art method of thermalizing a chip, which can be solved in accordance with an illustrative embodiment.

With reference to FIG. 2, this figure depicts a block diagram of a problem with a prior-art method of thermalizing a chip, which can be solved in accordance with an illustrative embodiment. Chip 202 comprises a set of LTDs 204. Cover 206 is affixed to chip 202 as a thermalization structure, but to make the thermalization effective, a thickness of chip 202 is reduces by removing substrate material 208.

A direction arrow in a figure depicts a top and bottom side of a chip as oriented in that figure. The direction arrow, as shown in this figure, indicates the top side of chip 202, with the bottom side of chip being the opposite of the top side. As depicted, the bottom side of reduced thickness chip 202 is thermalized with a top side of cover 206.

Figure 3:
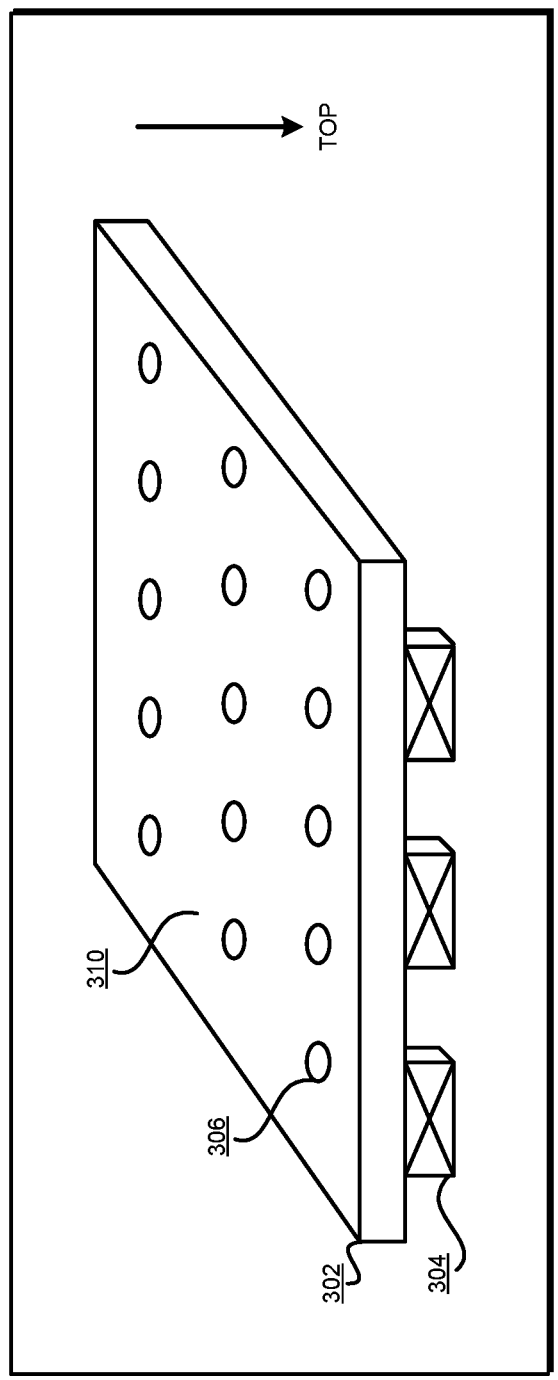
FIG. 3 depicts a block diagram of a chip with a set of cavities in accordance with an illustrative embodiment.

With reference to FIG. 3, this figure depicts a block diagram of a chip with a set of cavities in accordance with an illustrative embodiment. Chip 302 has not been thinned and retains the thickness using which devices 304 have been fabricated on the top side of chip 302. A non-limiting example set of cavities 306 are depicted on the bottom side of chip 302. Surface 310 of chip 302 is a thermal surface of chip 302, as described herein. An instance of cavity 306 bears one or more properties of a cavity as described herein. The arrangement, numerosity, symmetry, or similarity of cavities 306 is not intended to be limiting on the illustrative embodiments.

Figure 4:
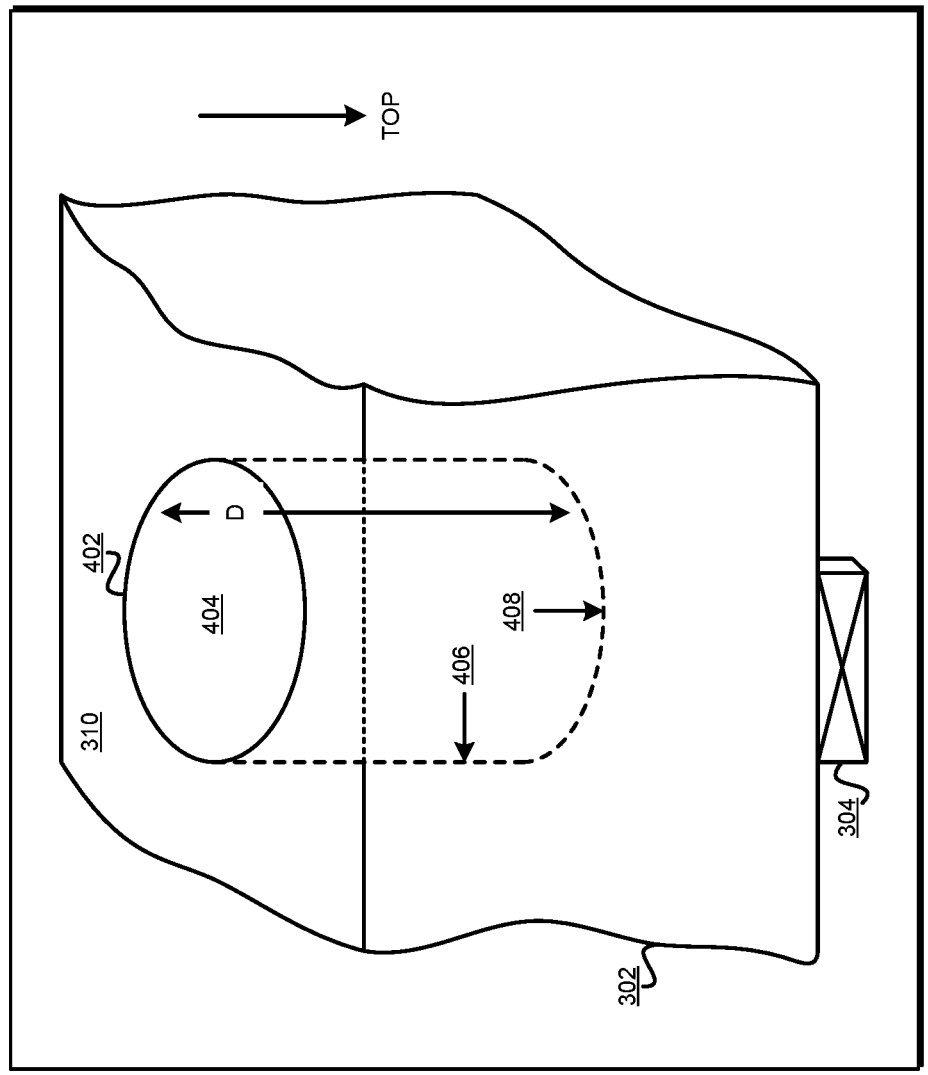
FIG. 4 depicts a block diagram of a detailed view of an example cavity in accordance with an illustrative embodiment.

With reference to FIG. 4, this figure depicts a block diagram of a detailed view of an example cavity in accordance with an illustrative embodiment. In this non-limiting example, chip 302 having LTD 304 is depicted to include cavity 402. Cavity 402 is a substantially uniform cylindrical cavity with a cross-section 404—which is substantially circular. Cavity 402 further has side wall 406. Base surface 408 of cavity 402, which is formed at depth D, can be flat, concave, convex, or of another contour.

Figure 5:
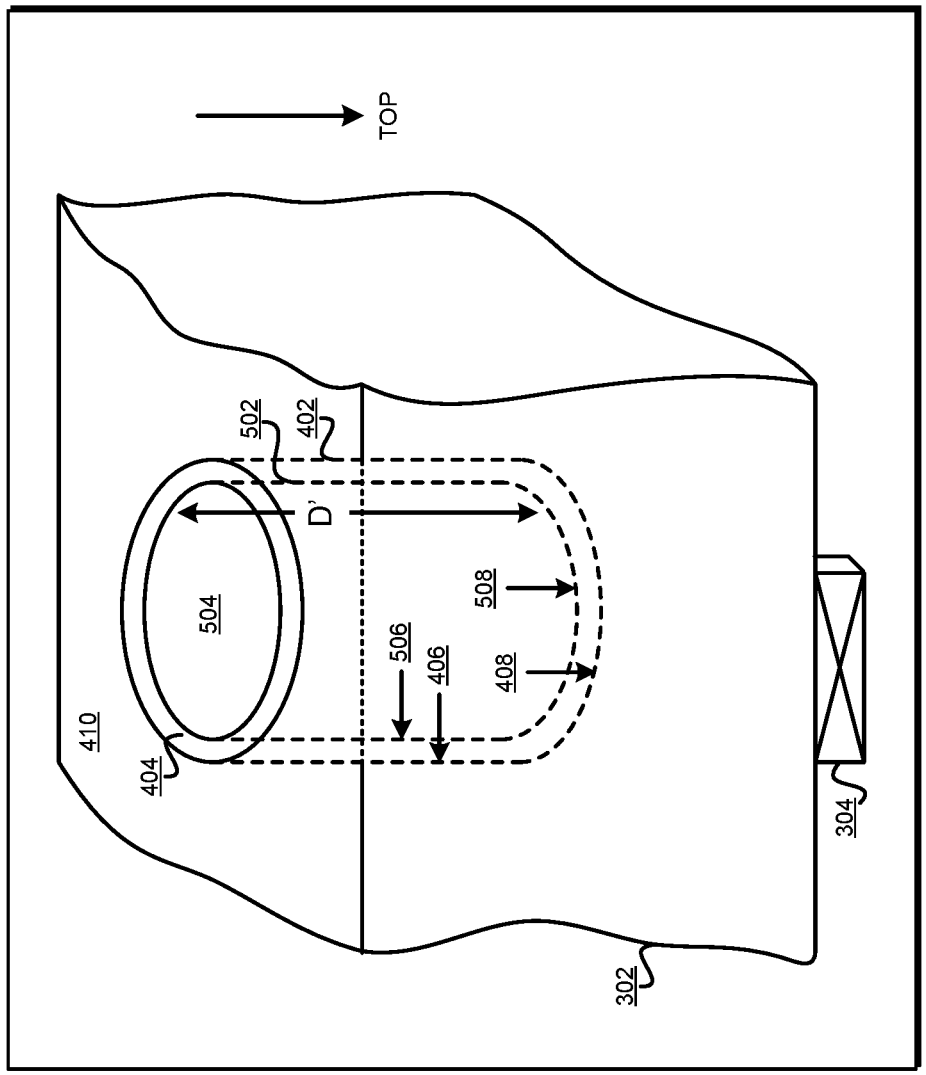
FIG. 5 depicts a block diagram of a detailed view of an example lined cavity in accordance with an illustrative embodiment.

With reference to FIG. 5, this figure depicts a block diagram of a detailed view of an example lined cavity in accordance with an illustrative embodiment. Chip 302 having LTD 304 is depicted to include cavity 402 as depicted and described in FIG. 4. An embodiment lines cavity 402 in a manner described herein. A layer is deposited in cavity 402 to form lined cavity 502. In this non-limiting example, lined cavity is a substantially uniform cylindrical cavity with a cross-section 504—which is substantially circular and reduces cross-section 404 of cavity 402. In one embodiment, the layer is deposited evenly in cavity 402 to cause a substantially uniform and concentric reduction of cross-section 404 to cross-section 504, but such uniformity is not essential in another embodiment. The layer further causes side wall 406 to become lined side wall 506. Base surface 508 of lined cavity 502 lies at a reduced depth D' as compared to depth D of cavity 402. Base 508 can be substantially conforming to base surface 408, or have a flat, concave, convex, or another contour that is different from a contour of base surface 408.

Figure 6:
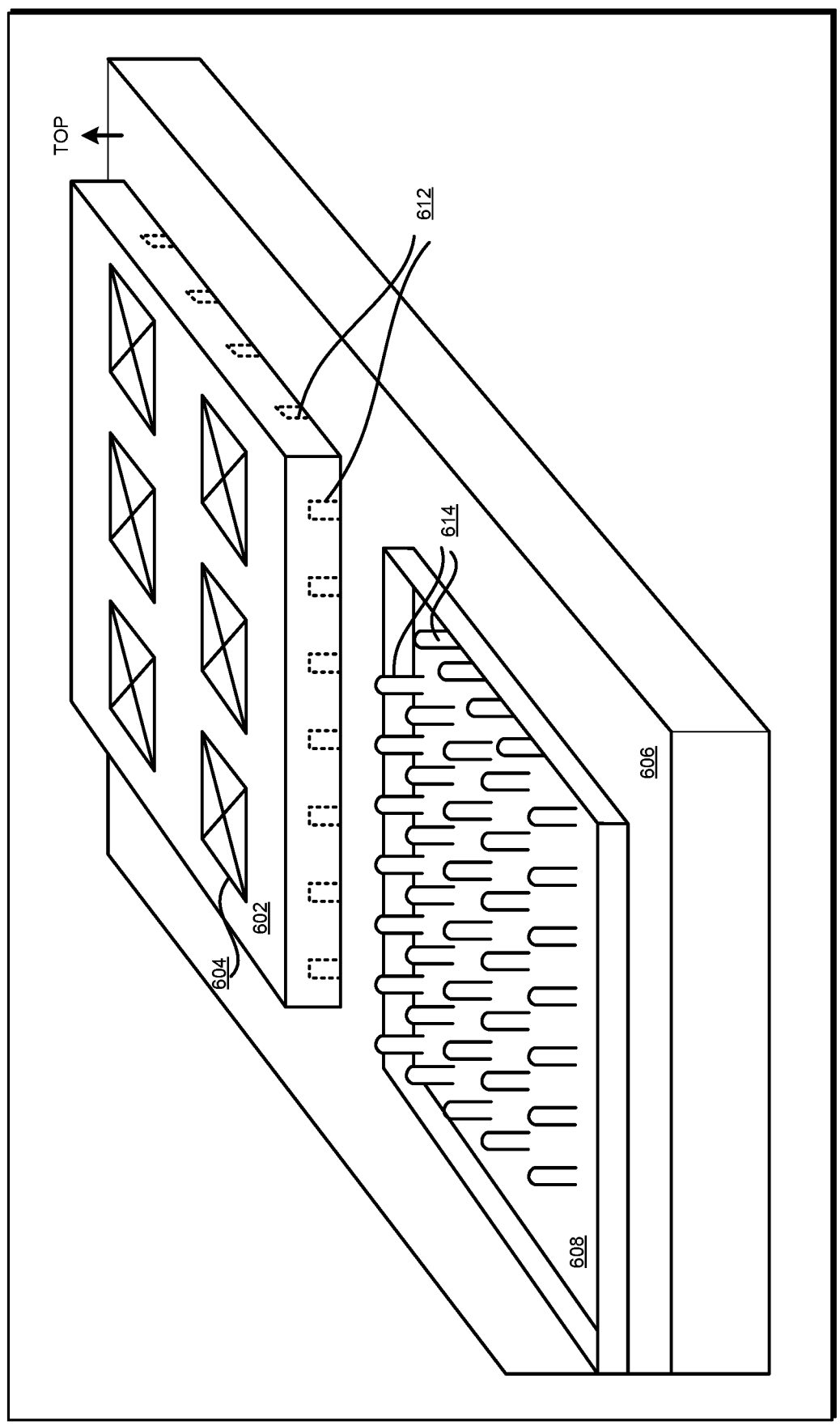
FIG. 6 depicts a block diagram of an example chip and cover configuration in accordance with an illustrative embodiment.

With reference to FIG. 6, this figure depicts a block diagram of an example chip and cover configuration in accordance with an illustrative embodiment. Chip 602 having a set of LTD 604 is similar to chip 302 with LTDs 304.

Chip 602 comprises a set of cavities 612 on a thermal surface similar to thermal surface 310 described herein. In one embodiment, an instance of cavity 612 is an unlined cavity, as in FIG. 4. In another embodiment, an instance of cavity 612 is a lined cavity, as in FIG. 5.

Cover 606 is a cover as described herein. Cover 606 comprises designated surface 608, which is depicted as a sunken area in cover 606 in this non-limiting example. Cover 606 comprises a set of pillars 614 formed on designated surface 608, as described herein. An instance of pillar 614 is formed to match a profile of a corresponding cavity 612 (or, an instance of cavity 612 is formed to match a profile of a corresponding pillar 614).

Figure 7:
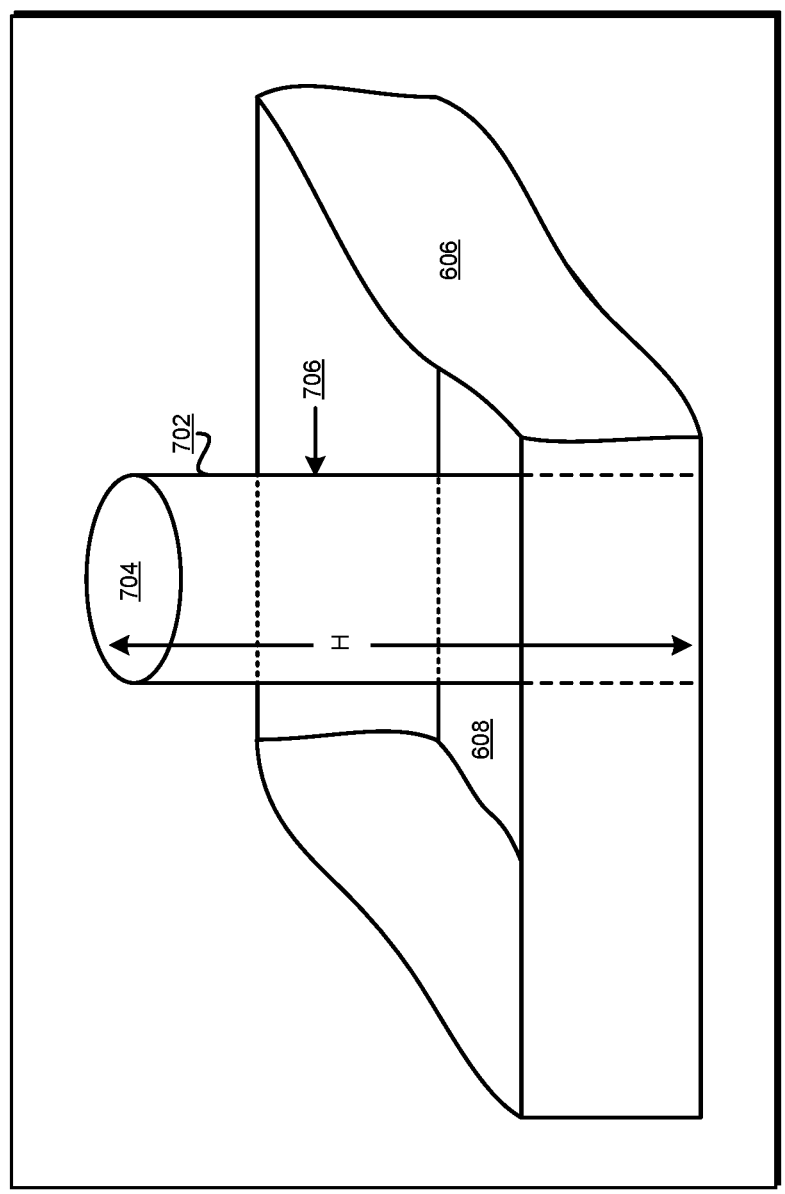
FIG. 7 depicts a block diagram of a detailed view of an example pillar in accordance with an illustrative embodiment.

With reference to FIG. 7, this figure depicts a block diagram of a detailed view of an example pillar in accordance with an illustrative embodiment. In this non-limiting example, cover 606 having designated surface 608 is depicted to include pillar 702. Pillar 702 is a substantially uniform cylindrical with a cross-section 704—which is substantially circular. Pillar 702 further has side wall 706. The top surface of pillar 702 lies at height H above designated surface 608, and can be flat, concave, convex, or of another contour, as might be compatible with a base of a corresponding cavity for maximizing heat transfer from the cavity base to the pillar top.

Figure 8:
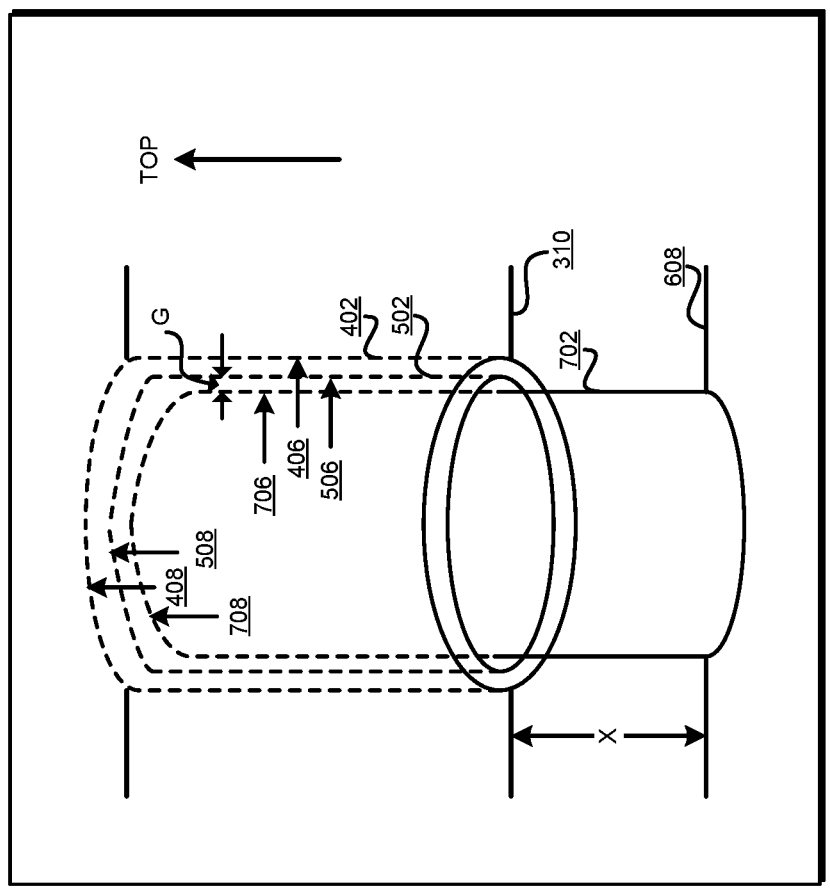
FIG. 8 depicts a block diagram of an example combination of a cavitied chip and a pillared cover for thermalization in accordance with an illustrative embodiment.

With reference to FIG. 8, this figure depicts a block diagram of an example combination of a cavitied chip and a pillared cover for thermalization in accordance with an illustrative embodiment. Lined cavity 502 is formed as described with respect to FIG. 5. Pillar 702 is formed as described with respect to FIG. 7.

In this example depiction, pillar 702 is shown to occupy lined cavity 502 within a gap tolerance G. The depiction exaggerates certain gaps and structures for clarity and preferably, once pillar 702 is coupled with unlined cavity 402 or lined cavity 502, separation X between thermal surface 310 and designated surface 608 is negligible, e.g., of the order of 0-5 micron, disregarding any surface imperfections.

Figure 9:
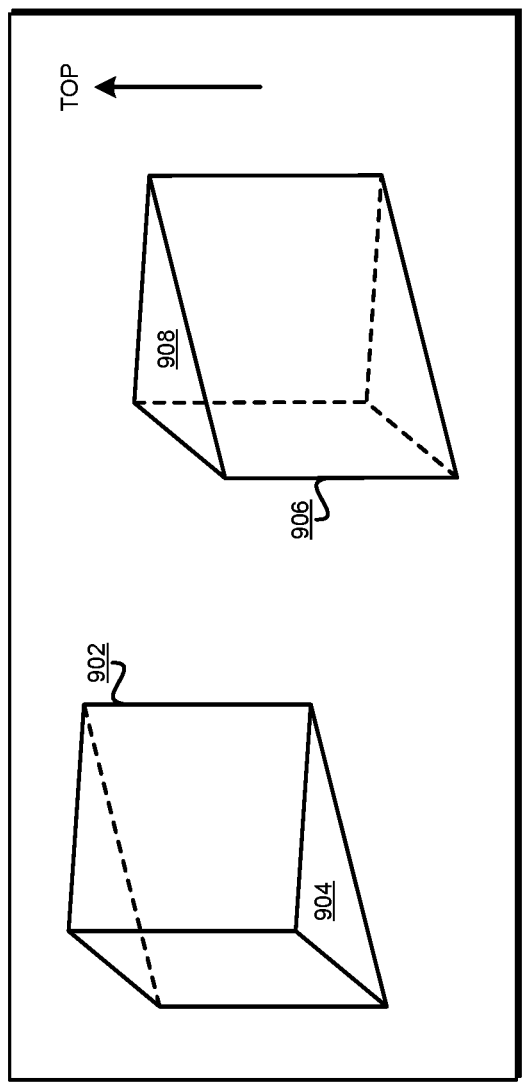
FIG. 9 depicts a block diagram of another example of a cavity and a pillar for thermalization in accordance with an illustrative embodiment.

With reference to FIG. 9, this figure depicts a block diagram of another example of a cavity and a pillar for thermalization in accordance with an illustrative embodiment. Cavity 902 is formed in a thermal surface of a chip as described herein and has a different cross-section geometry, e.g., triangle 904. Pillar 906 has a compatible triangular cross-section 908, which an embodiment configures to couple with cavity 902 within a specified gap tolerance.

Figure 10:
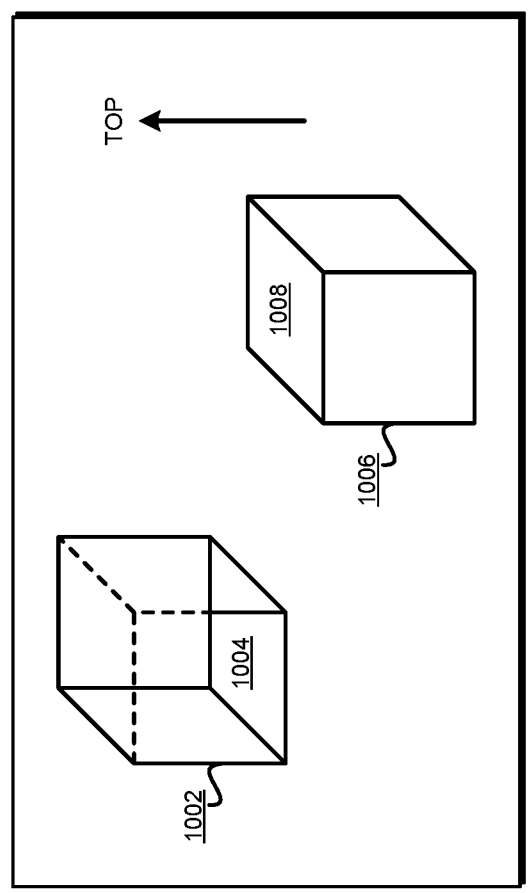
FIG. 10 depicts a block diagram of another example of a cavity and a pillar for thermalization in accordance with an illustrative embodiment.

With reference to FIG. 10, this figure depicts a block diagram of another example of a cavity and a pillar for thermalization in accordance with an illustrative embodiment. Cavity 1002 is formed in a thermal surface of a chip as described herein and has a different cross-section geometry, e.g., rectangle 1004. Pillar 1006 has a compatible rectangular cross-section 1008, which an embodiment configures to couple with cavity 1002 within a specified gap tolerance.

Cross-sections 904, 908, 1004, and 1008 are depicted and described as geometric shapes only as non-limiting examples. From this disclosure, those of ordinary skill in the art will be able to conceive many other regular, geometric, non-geometric, and even irregular cross-sections and the same are contemplated within the scope of the illustrative embodiments. Furthermore, a geometric cross-section may be irregular within a define tolerance considering that acceptable variations exist in fabrication and manufacturing processes.

Figure 11:
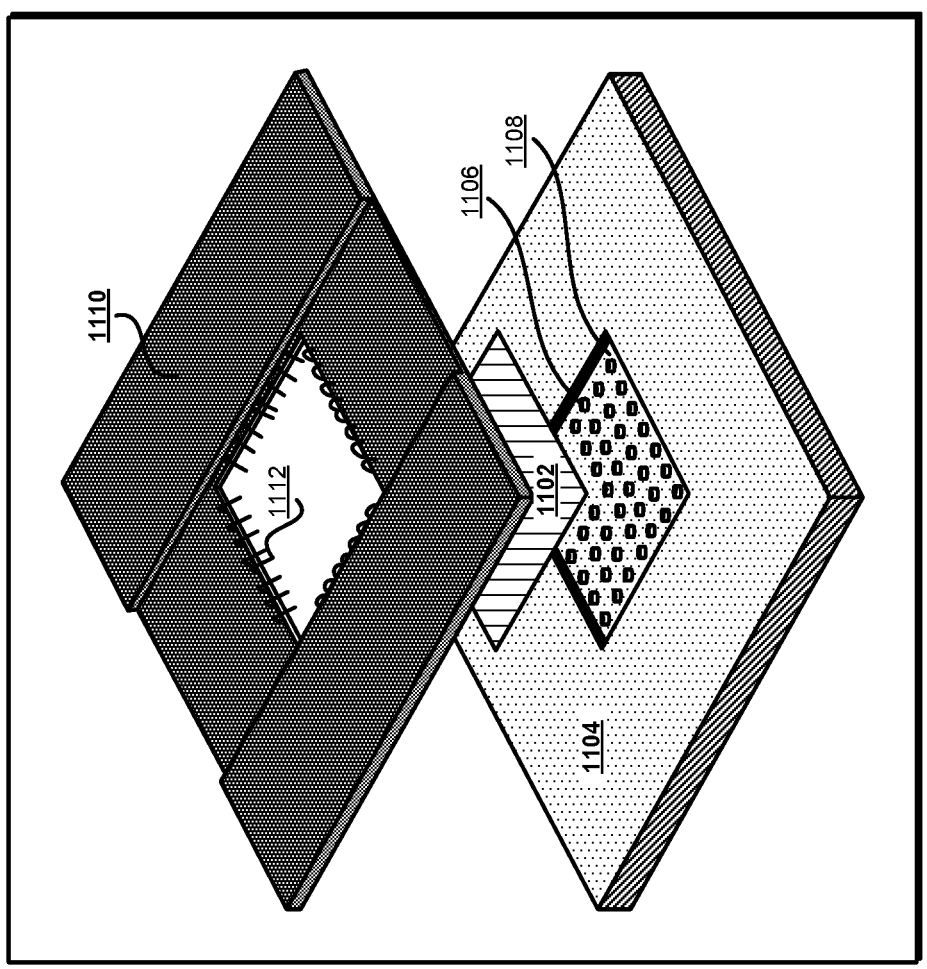
FIG. 11 depicts a block diagram of an example LTD thermalized in accordance with an illustrative embodiment.

With reference to FIG. 11, this figure depicts a block diagram of an example LTD thermalized in accordance with an illustrative embodiment. Chip 1102 is an example of any of the chips described with respect to FIG. 3-10 and has LTD components (not shown) fabricated on the surface that is visible in the figure. The thermal surface of chip 1102 is not visible. Chip 1102 is coupled with cover 1104. A set of pillars 1106 can be seen on designated surface 1108. The set of pillars 1106, or a subset thereof, will couple with a set or subset of corresponding cavities in the thermal surface of chip 1102 in a manner described herein.

PCB 1110 is fabricated to include external circuit elements that have to be coupled to the LTD components, e.g., qubits, on chip 1102. In one implementation, a set of wire bonds 1112 facilitates the electrical coupling of the external circuit elements with the LTD components on chip 1102.

With reference to FIG. 12, this figure depicts a block diagram of an example LTD thermalized in accordance with an illustrative embodiment. Chip 1102 is coupled with cover 1104 and PCB 1110 in a manner described with respect to FIG. 11. Configuration 1200 further shows top cover 1202 which completes the assembly of the cryogenic package. Top cover 1202 fastens to bottom cover 1104, and secures any intervening components, such as PCB 1110, with fasteners 1204. In one embodiment, when a top surface of chip 1102 can also be thermalized (e.g., when chip 1102 is a flip-chip assembly), an embodiment configures top cover 1202 with a set of pillars (not shown) in a designated surface (not shown) in top cover 1202. The set of pillars in top cover 1202 then couple with corresponding set of cavities (not shown) in a top thermal surface (not shown) of chip 1102.

Configuration 1220 depicts a thermalized package ready for cryogenic operation. Top cover 1202, PCB 1110, and bottom cover 1104 are visible. Chip 1102 is completely enclosed in this thermalized package and can be operated in an appropriate cryogenic coolant, e.g., liquid helium.

Figure 13:
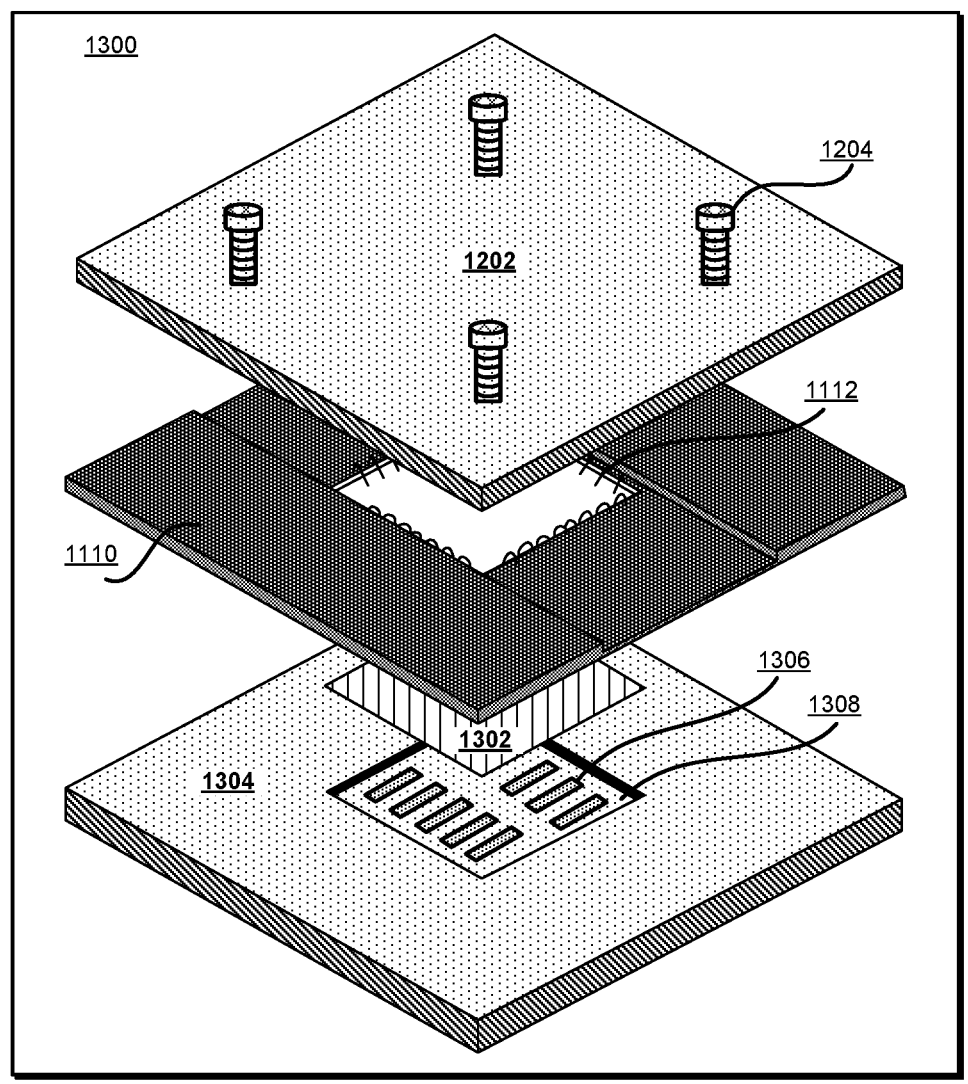
FIG. 13 depicts a block diagram of an example LTD thermalized in accordance with an illustrative embodiment.

With reference to FIG. 13, this figure depicts a block diagram of an example LTD thermalized in accordance with an illustrative embodiment. Chip 1302 is an example of any of the chips described with respect to FIG. 3-12 and has LTD components (not shown) fabricated on the surface that is visible in the figure. The thermal surface of chip 1302 is not visible. Chip 1302 is coupled with cover 1304. A set of pillars 1306 can be seen on designated surface 1308. Pillars 1306 are formed with elongated rounded cornered rectangular cross-sections, as another non-limiting variation on the cross-sectional shapes that can be fabricated using an embodiment. The set of pillars 1306, or a subset thereof, will couple with a set or subset of correspondingly shaped and positioned cavities (not shown) in the thermal surface of chip 1302 in a manner described herein.

Figure 14:
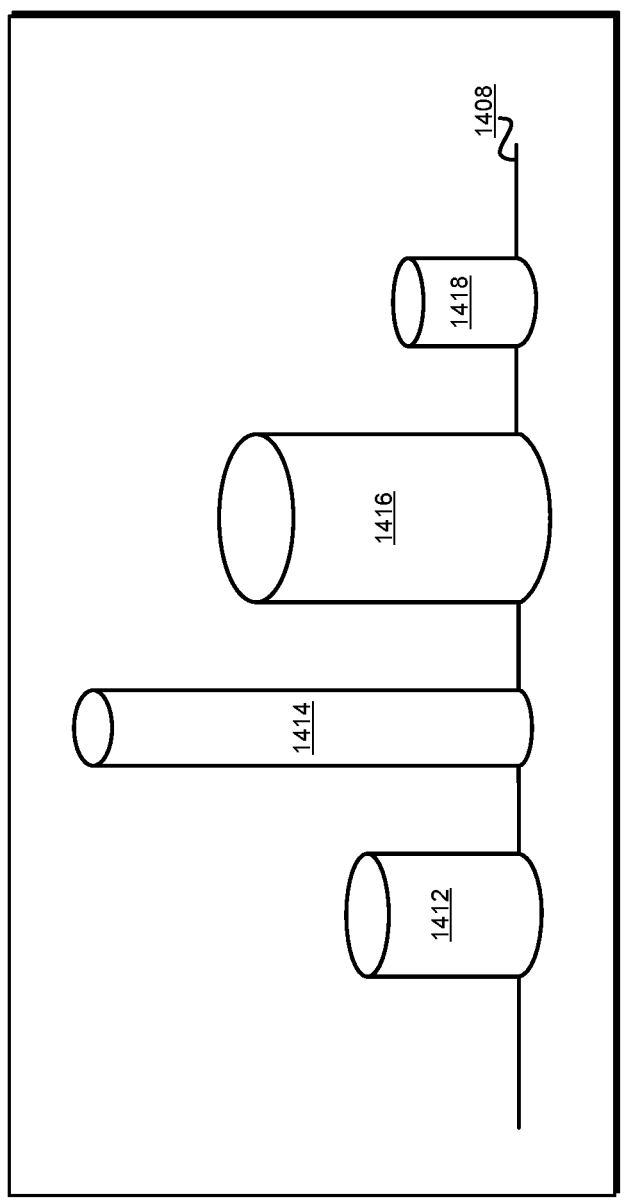
FIG. 14 depicts a block diagram of an example configuration of pillars in accordance with an illustrative embodiment.

With reference to FIG. 14, this figure depicts a block diagram of an example configuration of pillars in accordance with an illustrative embodiment. Surface 1408 is a designated surface on a cover, as described herein. A set of pillars 1412, 1414, 1416, and 1418 is formed by an embodiment in a manner described herein. As can be seen, each of pillars 1412, 1414, 1416, and 1418 has similar cross-section geometry but of different cross-sectional areas and has different heights.

Figure 15:
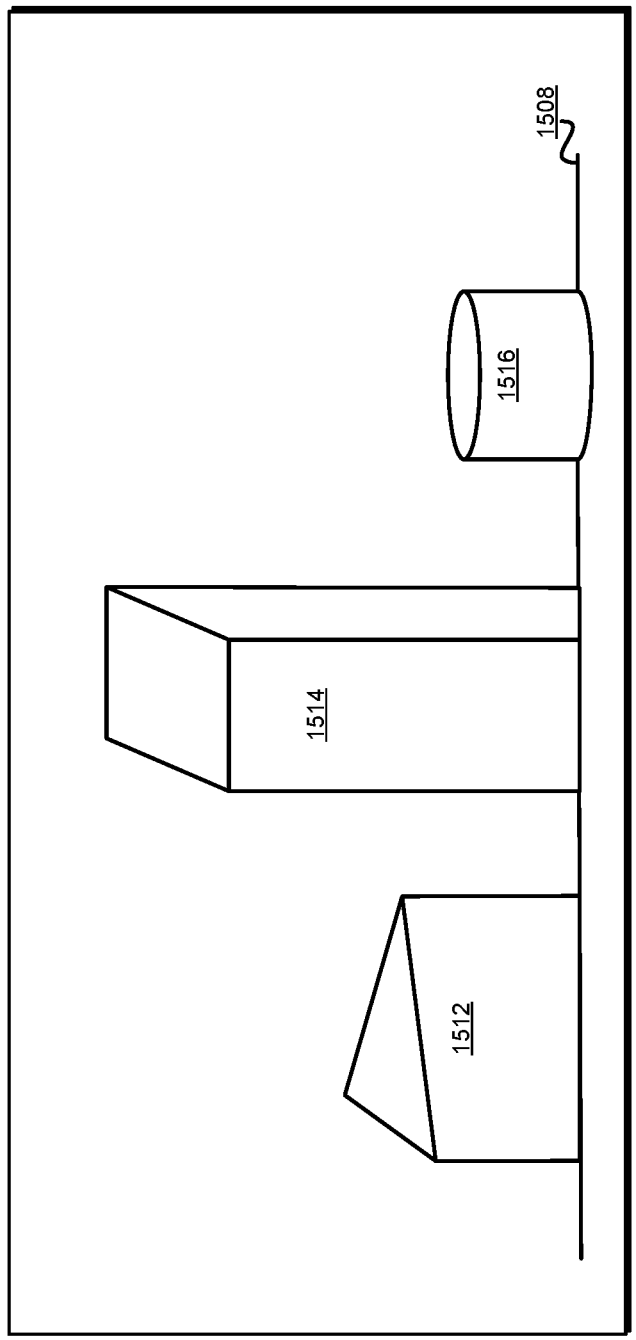
FIG. 15 depicts a block diagram of an example configuration of pillars in accordance with an illustrative embodiment.

With reference to FIG. 15, this figure depicts a block diagram of an example configuration of pillars in accordance with an illustrative embodiment. Surface 1508 is a designated surface on a cover, as described herein. A set of pillars 1512, 1514, and 1516 is formed by an embodiment in a manner described herein. As can be seen, each of pillars 1512, 1514, and 1516 has a different cross-section geometry, different cross-sectional areas, and different heights.

Figure 16:
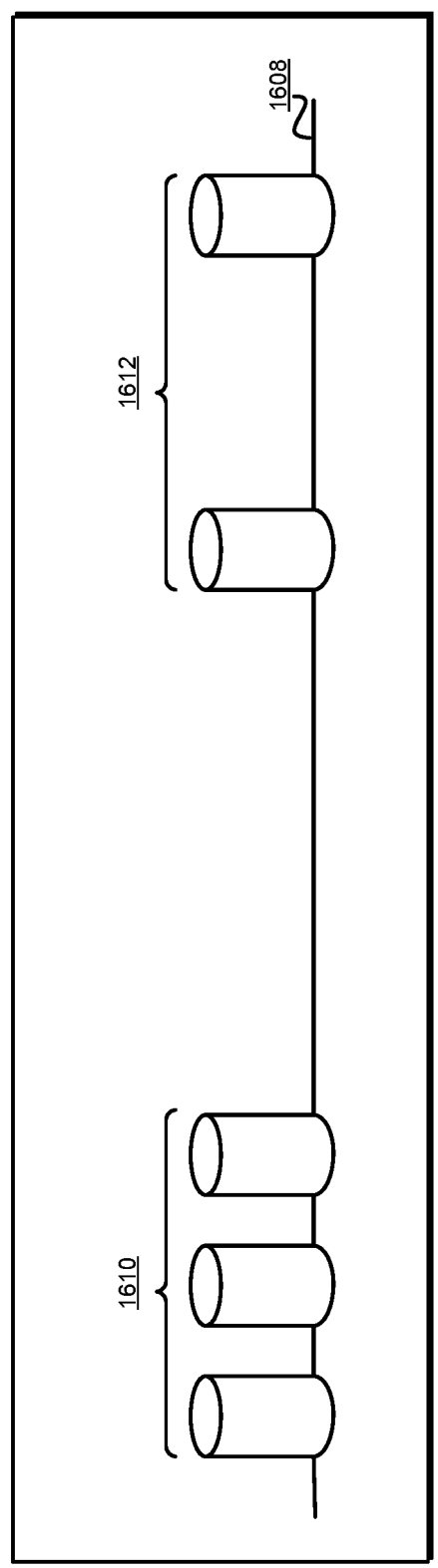
FIG. 16 depicts a block diagram of an example configuration of pillars in accordance with an illustrative embodiment.

With reference to FIG. 16, this figure depicts a block diagram of an example configuration of pillars in accordance with an illustrative embodiment. Surface 1608 is a designated surface on a cover, as described herein. An embodiment forms a first subset 1610 of pillars with a first pillar density in a first area of designated surface 1608, and a second subset 1612 of pillars with a different pillar density in a second area of designated surface 1608.

These examples of pillar shapes, sizes, and densities are not intended to be limiting. From this disclosure, those of ordinary skill in the art will be able to conceive many other combinations of shapes, sizes and densities of pillars, and the corresponding shapes, sizes, and densities of cavities of a particular implementation, and the same are contemplated within the scope of the illustrative embodiments.

Figure 17:
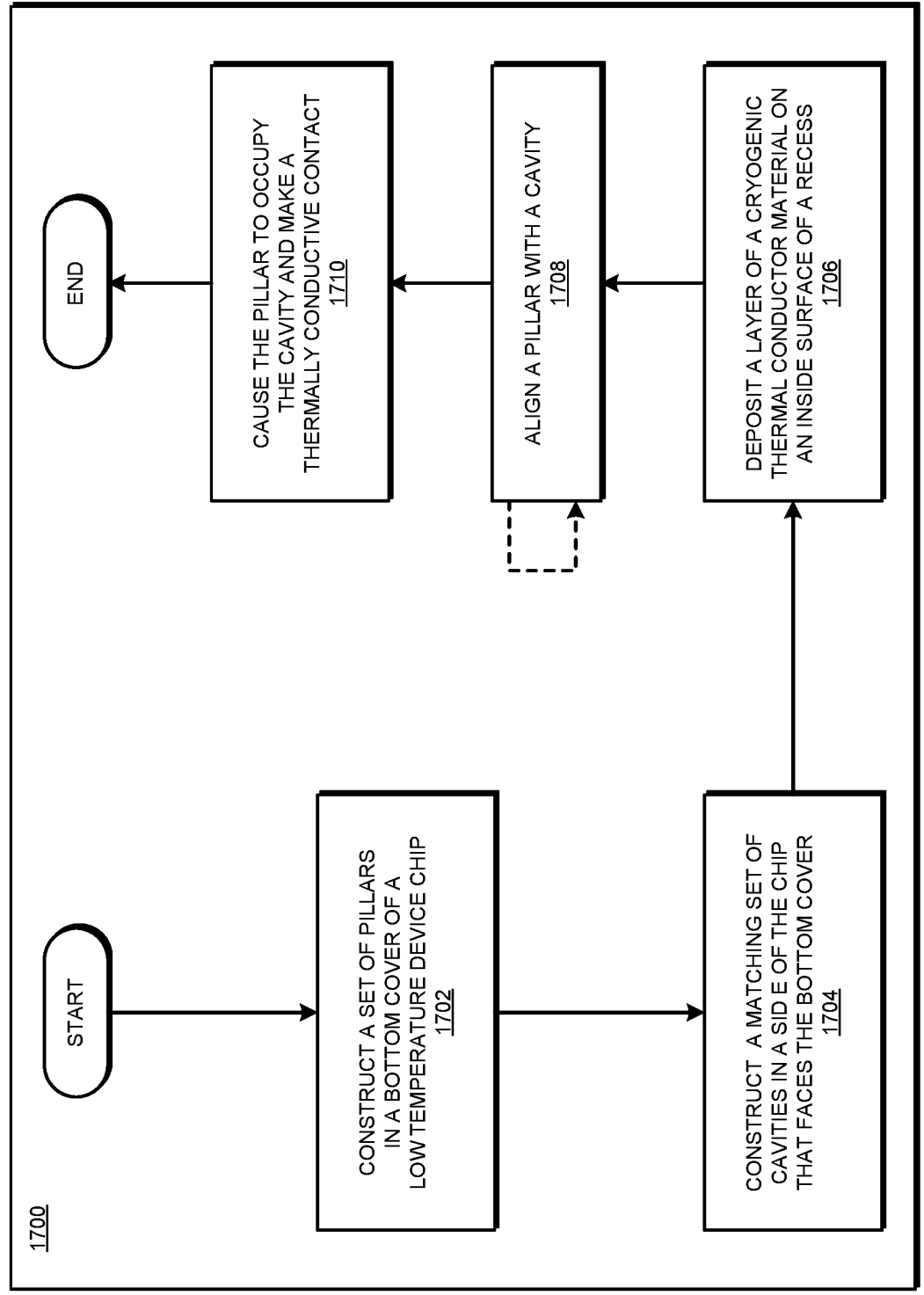
FIG. 17 depicts a flowchart of an example process for forming a cryogenic packaging for thermalization of low temperature devices in accordance with an illustrative embodiment.

With reference to FIG. 17, this figure depicts a flowchart of an example process for forming a cryogenic packaging for thermalization of low temperature devices in accordance with an illustrative embodiment. Process 1700 can be implemented in application 105 in FIG. 1.

The application forms, or causes to be formed, a set of pillars in a cover for a chip (block 1702). The cover can be but need not necessarily be a bottom cover. The chip includes a device or devices that is/are designed to be operated in cryogenic temperature range.

The application forms, or causes to be formed, a matching set of cavities in a surface of the chip that is to be thermalized with the surface of the cover on which the set of pillars is fabricated (block 1704). Optionally, the application deposits, or causes to be deposited, a lining of a cryogenic thermal conductor material on an inside surface of a cavity (block 1706). Some, all, or none of the cavities in the set of cavities may be lined.

The application aligns, or causes to be aligned, a pillar with a corresponding cavity (block 1708). The application may repeat block 1708 when multi-point alignment is needed in an implementation.

The application causes the aligned pillar to occupy the cavity and make a thermally conductive coupling between the chip and the cover effectively thermalizing the chip for cryogenic operations (block 1710). The application ends process 1700 thereafter.

Various embodiments of the present invention are described herein with reference to the related drawings. Alternative embodiments can be devised without departing from the scope of this invention. Although various connections and positional relationships (e.g., top, bottom, over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A thermalization structure, comprising:
    a detachable thermalization cover configured with a set of pillars on a designated surface of the thermalization cover;
    a chip configured with a set of cavities, a cavity in the set of cavities having a cavity profile, wherein a pillar from the set of pillars corresponds to the cavity and has a pillar profile such that the pillar profile causes the pillar to couple with the cavity of the cavity profile within a gap tolerance to thermally couple and align the chip to the thermalization cover through the pillar.

2. The thermalization structure of claim 1, wherein a subset of the set of pillars is coupled with a subset of the set of cavities to thermally couple the chip to the cover.

3. The thermalization structure of claim 1, wherein a first pillar in the set of pillars has a different cross-section than a second pillar in the set of pillars.

4. The thermalization structure of claim 1, wherein a first pillar in the set of pillars has a different height than a second pillar in the set of pillars.

5. The thermalization structure of claim 1, wherein a first subset of pillars in the set of pillars has a different pillar density per unit of area of a designated surface of the cover than a second subset of pillars in the set of pillars.

6. The thermalization structure of claim 1, wherein the chip comprises a flip-chip assembly, the thermalization structure further comprising:
    a second cover configured with a second set of pillars, the second cover being a part of the cryogenic enclosure; and
    a second chip in the flip-chip configuration, the second chip configured with a second set of cavities, a second cavity in the second set of cavities having a second cavity profile, wherein a second pillar from the second set of pillars and corresponding to the second cavity has a second pillar profile such that the second pillar profile causes the second pillar to couple with the second cavity of the second cavity profile within a second gap tolerance to thermally couple the second chip to the second cover for heat dissipation in a cryogenic operation of the flip-chip.

7. The thermalization structure of claim 1, wherein a cross-sectional shape of the cavity is determined by a location of the cavity on a thermal surface of the chip.

8. The thermalization structure of claim 1, wherein a first cavity in the set of cavities has a different cross-section than a second cavity in the set of cavities.

9. The thermalization structure of claim 1, wherein a first cavity in the set of cavities has a different depth than a second cavity in the set of cavities.

10. The thermalization structure of claim 1, wherein a first subset of cavities in the set of cavities has a different cavity density per unit of area of a thermal surface of the chip than a second subset of cavities in the set of cavities on the thermal surface.

11. The thermalization structure of claim 1, wherein a first cavity in the set of cavities is configured to align the chip with a designated surface on the cover, and a second cavity in the set of cavities is configured to thermalize the chip with the cover.

12. The thermalization structure of claim 1, further comprising:
    a liner in a cavity from the set of cavities, wherein the liner comprises a material that is a better thermal conductor than a substrate material of the chip in a cryogenic temperature range.

13. The thermalization structure of claim 12, wherein the liner is deposited on a first surface of the cavity but not on a second surface of the cavity.

14. The thermalization structure of claim 1, further comprising:
    a liner on a pillar from the set of pillars, wherein the liner comprises a material that is a better thermal conductor than a substrate material of the cover in a cryogenic temperature range.

15. The thermalization structure of claim 14, wherein the liner is deposited on a first surface of the pillar but not on a second surface of the pillar.

16. The thermalization structure of claim 1, wherein the set of pillars is movable with respect to the chip.

* * * * *